(12) United States Patent
Ottavio

(10) Patent No.: US 9,501,363 B1
(45) Date of Patent: Nov. 22, 2016

(54) DISTRIBUTED DATABASE MANAGEMENT SYSTEM WITH NODE FAILURE DETECTION

(71) Applicant: Nuodb, Inc., Cambridge, MA (US)

(72) Inventor: Daniel P. Ottavio, Watertown, MA (US)

(73) Assignee: NuoDB, Inc., Cambridge, MA (US)

( * ) Notice: Subject to any disclaimer, the term of this patent is extended or adjusted under 35 U.S.C. 154(b) by 0 days.

(21) Appl. No.: 14/215,372

(22) Filed: Mar. 17, 2014

Related U.S. Application Data

(60) Provisional application No. 61/789,370, filed on Mar. 15, 2013.

(51) Int. Cl.
| | |
|---|---|
| *G06F 11/00* | (2006.01) |
| *G06F 11/14* | (2006.01) |
| *G06F 11/30* | (2006.01) |
| *G06F 11/07* | (2006.01) |

(52) U.S. Cl.
CPC ....... *G06F 11/1425* (2013.01); *G06F 11/0709* (2013.01); *G06F 11/3006* (2013.01)

(58) Field of Classification Search
CPC ............. G06F 11/0709; G06F 11/079; G06F 11/0793; G06F 11/142; G06F 11/1425; G06F 11/26; G06F 11/3006
USPC .......... 714/4.1, 4.2, 4.4, 25, 33, 37, 40, 47.1
See application file for complete search history.

(56) References Cited

U.S. PATENT DOCUMENTS

| | | | |
|---|---|---|---|
| 5,446,887 A | 8/1995 | Berkowitz | |
| 5,524,240 A | 6/1996 | Barbara et al. | |
| 5,555,404 A | 9/1996 | Torbjørnsen et al. | |
| 5,701,467 A | 12/1997 | Freeston | |
| 5,764,877 A | 6/1998 | Lomet et al. | |
| 5,960,194 A | 9/1999 | Choy et al. | |
| 6,216,151 B1 | 4/2001 | Antoun | |
| 6,275,863 B1 | 8/2001 | Leff et al. | |
| 6,334,125 B1 | 12/2001 | Johnson et al. | |
| 6,401,096 B1 | 6/2002 | Zellweger | |
| 6,424,967 B1 | 7/2002 | Johnson et al. | |
| 6,480,857 B1 | 11/2002 | Chandler | |
| 6,499,036 B1 | 12/2002 | Gurevich | |
| 6,523,036 B1 | 2/2003 | Hickman et al. | |

(Continued)

FOREIGN PATENT DOCUMENTS

| | | |
|---|---|---|
| EP | 1403782 A2 | 3/2004 |
| JP | 2003-256256 | 9/2003 |

(Continued)

OTHER PUBLICATIONS

U.S. Appl. No. 14/215,401, filed Mar. 17, 2014, Palmer.

(Continued)

*Primary Examiner* — Joseph D Manoskey

(74) *Attorney, Agent, or Firm* — Cooley LLP

(57) ABSTRACT

A node failure detector for use in a distributed database that is accessed through a plurality of interconnected transactional and archival nodes. Each node is selected as an informer node that tests communications with each other node. Each informer node generates a list of suspicious nodes that is resident in one node designated as a leader node. The leader node analyzes the data from all of the informer nodes to designate each node that should be designated for removal with appropriate failover procedures.

16 Claims, 8 Drawing Sheets

(56) References Cited

U.S. PATENT DOCUMENTS

| | | | |
|---|---|---|---|
| 6,748,394 | B2 | 6/2004 | Shah et al. |
| 6,862,589 | B2 | 3/2005 | Grant |
| 7,028,043 | B2 | 4/2006 | Bleizeffer et al. |
| 7,080,083 | B2 | 7/2006 | Kim et al. |
| 7,096,216 | B2 | 8/2006 | Anonsen |
| 7,219,102 | B2 | 5/2007 | Zhou et al. |
| 7,233,960 | B1 | 6/2007 | Boris et al. |
| 7,293,039 | B1 | 11/2007 | Deshmukh et al. |
| 7,395,352 | B1 | 7/2008 | Lam et al. |
| 7,401,094 | B1 | 7/2008 | Kesler |
| 7,403,948 | B2 | 7/2008 | Ghoneimy et al. |
| 7,562,102 | B1 | 7/2009 | Sumner et al. |
| 7,853,624 | B2 | 12/2010 | Friedlander et al. |
| 7,890,508 | B2 | 2/2011 | Gerber et al. |
| 8,108,343 | B2 | 1/2012 | Wang et al. |
| 8,224,860 | B2 | 7/2012 | Starkey |
| 8,266,122 | B1 | 9/2012 | Newcombe et al. |
| 8,504,523 | B2 | 8/2013 | Starkey |
| 8,756,237 | B2 | 6/2014 | Stillerman et al. |
| 2002/0112054 | A1 | 8/2002 | Hatanaka |
| 2002/0152261 | A1 | 10/2002 | Arkin et al. |
| 2002/0152262 | A1 | 10/2002 | Arkin et al. |
| 2003/0051021 | A1 | 3/2003 | Herschfeld et al. |
| 2003/0204486 | A1 | 10/2003 | Berks et al. |
| 2003/0204509 | A1* | 10/2003 | Dinker .............. G06F 17/30575 |
| 2003/0220935 | A1 | 11/2003 | Vivian et al. |
| 2003/0233595 | A1* | 12/2003 | Charny .................. H04L 45/00 714/4.1 |
| 2004/0153459 | A1 | 8/2004 | Whitten |
| 2005/0086384 | A1 | 4/2005 | Ernst |
| 2005/0216502 | A1 | 9/2005 | Kaura et al. |
| 2008/0320038 | A1 | 12/2008 | Liege |
| 2010/0094802 | A1 | 4/2010 | Luotojarvi et al. |
| 2010/0115338 | A1* | 5/2010 | Rao ..................... G06F 11/0709 714/37 |
| 2010/0153349 | A1 | 6/2010 | Schroth |
| 2010/0235606 | A1 | 9/2010 | Oreland et al. |
| 2010/0297565 | A1 | 11/2010 | Waters et al. |
| 2011/0087874 | A1 | 4/2011 | Timashev et al. |
| 2011/0231447 | A1* | 9/2011 | Starkey ............. G06F 17/30575 707/792 |
| 2012/0136904 | A1 | 5/2012 | Venkata Naga Ravi |
| 2012/0254175 | A1 | 10/2012 | Horowitz et al. |
| 2013/0060922 | A1 | 3/2013 | Koponen et al. |
| 2013/0110766 | A1 | 5/2013 | Promhouse et al. |
| 2013/0159265 | A1 | 6/2013 | Peh et al. |
| 2013/0232378 | A1 | 9/2013 | Resch et al. |
| 2013/0297976 | A1* | 11/2013 | McMillen ............. G06F 11/079 714/43 |
| 2013/0311426 | A1 | 11/2013 | Erdogan et al. |
| 2014/0279881 | A1 | 9/2014 | Tan et al. |
| 2014/0297676 | A1 | 10/2014 | Bhatia et al. |
| 2014/0304306 | A1 | 10/2014 | Proctor et al. |

FOREIGN PATENT DOCUMENTS

| | | |
|---|---|---|
| JP | 2006-048507 | 2/2006 |
| JP | 2007-058275 | 3/2007 |

OTHER PUBLICATIONS

U.S. Appl. No. 14/215,461, filed Mar. 17, 2014, Palmer.
U.S. Appl. No. 14/616,713, filed Feb. 8, 2015, Levin.
U.S. Appl. No. 14/688,396, filed Apr. 16, 2015, Shaull.
U.S. Appl. No. 14/725,916, filed May 29. 2015, Rice.
U.S. Appl. No. 14/726,200, filed May 29, 2015, Palmer.
U.S. Appl. No. 14/744,546, filed Jun. 19, 2015, Massari.
"Album Closing Policy," Background, retrieved from the Internet at URL:http://tools/wiki/display/ENG/Album+Closing+Policy (Jan. 29, 2015), 4 pp.
"Distributed Coordination in NuoDB," YouTube, retrieved from the Internet at URL:https://www.youtube.com/watch?feature=player_embedded&v=URoeHvflVKg on Feb. 4, 2015, 2 pp.
Bergsten et al., "Overview of Parallel Architectures for Databases," *The Computer Journal* vol. 36, No. 8, pp. 734-740 (1993).
Dan et al., "Performance Comparisons of Buffer Coherency Policies," Proceedings of the International Conference on Distributed Computer Systems, *IEEE Comp. Soc. Press* vol. 11, pp. 208-217 (1991).
Durable Distributed Cache Architecture, retrieved from the Internet at URL: http://www.nuodb.com/explore/newsql-cloud-database-ddc-architecture on Feb. 4, 2015, 3 pp.
"Glossary—NuoDB 2.1 Documentation/NuoDB," retrieved from the Internet at URL: http://doc.nuodb.com/display/doc/Glossary on Feb. 4, 2015, 1 pp.
"How It Works," retrieved from the Internet at URL: http://www.nuodb.com/explore/newsql-cloud-database-how-it-works?mkt_tok=3RkMMJW on Feb. 4, 2015, 4 pp.
"How to Eliminate MySQL Performance Issues," NuoDB Technical Whitepaper, Sep. 10, 2014, Version 1, 11 pp.
"Hybrid Transaction and Analytical Processing with NuoDB," NuoDB Technical Whitepaper, Nov. 5, 2014, Version 1, 13 pp.
International Preliminary Report on Patentability mailed Oct. 13, 2015 from PCT/US2014/033270, 4 pp.
International Search Report and Written Opinion mailed Aug. 21, 2014 from PCT/US2014/033270, 5 pp.
International Search Report mailed Sep. 26, 2012 from PCT/US2011/029056, 4 pp.
Leverenz et al., "Oracle8i Concepts, Partitioned Tables and Indexes," Chapter 11, pp. 11-2-11/66 (1999).
"No Knobs Administration," retrieved from the Internet at URL: http://www.nuodb.com/explore/newsql-cloud-database-product/auto-administration on Feb. 4, 2015, 4 pp.
Non-Final Office Action mailed Jan. 21, 2016 from U.S. Appl. No. 14/215,401, 19 pp.
Non-Final Office Action mailed Feb. 1, 2016 from U.S. Appl. No. 14/215,461, 19 pp.
Non-Final Office Action mailed Feb. 06, 2014 from U.S. Appl. No. 13/933,483, 14 pp.
Non-Final Office Action mailed May 19, 2016 from U.S. Appl. No. 14/247,364, 24 pp.
Non-Final Office Action mailed Oct. 10, 2012 from U.S. Appl. No. 13/525,953, 8 pp.
Notice of Allowance mailed Feb. 29, 2012 from U.S. Appl. No. 13/051,750, 8 pp.
Notice of Allowance mailed Apr. 1, 2013 from U.S. Appl. No. 13/525,953, 10 pp.
Notice of Allowance mailed May 14, 2012 from U.S. Appl. No. 13/051,750, 8 pp.
NuoDB at a Glance, retrieved from the Internet at URL: http://doc.nuodb.com/display/doc/NuoDB+at+a+Glance on Feb. 4, 2015, 1 pp.
Rahimi, S. K. et al., "Distributed Database Management Systems: A Practical Approach," IEEE Computer Society, John Wiley & Sons, Inc. Publications (2010), 765 pp.
Shaull, R. et al., "A Modular and Efficient Past State System for Berkeley DB," Proceedings of USENIX ATC '14:2014 USENIX Annual Technical Conference, 13 pp. (Jun. 19-20, 2014).
Shaull, R. et al., "Skippy: A New Snapshot Indexing Method for Time Travel in the Storage Manager," SIGMOD'08, Jun. 9-12, 2008, 12 pp.
Shaull, R., "Retro: A Methodology for Retrospection Everywhere," A Dissertation Presented to the Faculty of the Graduate School of Arts and Sciences of Brandeis University, Waltham, Massachusetts, Aug. 2013, 174 pp.
"SnapShot Albums," Transaction Ordering, retrieved from the Internet at URL:http://tools/wiki/display/ENG/Snapshot+Albums (Aug. 12, 2014), 4 pp.
"Table Partitioning and Storage Groups (TPSG)," Architect's Overview, NuoDB Technical Design Document, Version 2.0 (2014), 12 pp.
"The Architecture & Motivation for NuoDB," NuoDB Technical Whitepaper, Oct. 5, 2014, Version 1, 27 pp.
"Welcome to NuoDB Swifts Release 2.1 GA," retrieved from the Internet at URL: http://dev.nuodb.com/techblog/welcome-nuodb-swifts-release-21-ga on Feb. 4, 2015, 7 pp.

(56) References Cited

OTHER PUBLICATIONS

"What Is A Distributed Database? And Why Do You Need One," NuoDB Technical Whitepaper, Jan. 23, 2014, Version 1, 9 pp.
Yousif, M. "Shared-Storage Clusters," *Cluster Computing*, Baltzer Science Publishers, Bussum, NL, vol. 2, No. 4, pp. 249-257 (1999).
Final Office Action mailed Sep. 9, 2016 from U.S. Appl. No. 14/215,461, 26 pp.
International Search Report and Written Opinion mailed Jul. 15, 2016 from PCT/US2016/27658, 37 pp.
International Search Report and Written Opinion mailed Sep. 8, 2016 from PCT/US16/37977, 11 pp.
International Search Report and Written Opinion mailed Sep. 9, 2016 from PCT/US16/34646, 12 pp.
Non-Final Office Action mailed Sep. 23, 2016 from U.S. Appl. No. 14/616,713, 8 pp.

* cited by examiner

MESSAGES

| 110 | PING |
|---|---|
| 111 | PING ANKNOWLEDGE |
| 159 | SUSPICIOUS NODE |
| 160 | LEADER ACKNOWLEDGEMENT | ially point out and distinctly

DISTRIBUTED DATABASE MANAGEMENT SYSTEM WITH NODE FAILURE DETECTION

CROSS REFERENCE TO RELATED PATENT

U.S. Pat. No. 8,224,860 granted Jul. 17, 2012 for a Database Management System and assigned to the same assignee as this invention is incorporated in its entirety herein by reference.

This application claims priority from U.S. Provisional Application Ser. No. 61/789,370 filed Mar. 15, 2013 for Node Failure Detection for a Distributed Database, which application is incorporated in its entirety by reference.

BACKGROUND OF THE INVENTION

Field of the Invention

This invention generally relates to database management systems and more specifically to detecting failures during the processing of a distributed database system.

Description of Related Art

The above-identified U.S. Pat. No. 8,224,860 discloses a distributed database management system comprising a network of transactional nodes and archival nodes. Archival nodes act as storage managers for all the data in the database. Each user connects to a transactional node to perform operations on the database by generating queries for being processed at that transactional node. A given transactional node need only contain that data and metadata as required to process queries from users connected to that node. This distributed database is defined by an array of atom classes, such as an index class, and atoms where each atom corresponds to a different instance of the class, such as index atom for a specific index. Replications or copies of a single atom may reside in multiple nodes wherein the atom copy in a given node is processed in that node.

In an implementation of such a distributed database asynchronous messages transfer among the different nodes to maintain the integrity of the database in a consistent and a concurrent state. Specifically each node in the database network has a unique communication path to every other node. When one node generates a message involving a specific atom, that message may be sent to every node that contains a replication of that specific atom. Each node generates these messages independently of other nodes. So at any given instant multiple nodes will contain copies of a given atom and different nodes may be at various stages of processing that atom. As the operations in different nodes are not synchronized it is important that the database be in a consistent and concurrent state at all times.

A major characteristic of such distributed databases is that all nodes be in communication with each other at all times so the database is completely connected. If a communications break occurs, the database is not considered to be connected. One or more nodes must be identified and may be removed from the network in an orderly manner. Such identification and removal must consider that any node can fail at any given time and that a communications break can occur only between two nodes or that multiple breaks can occur among several nodes. The identification of a node or nodes for removal must be accomplished in a reliable manner. Moreover such an identification should enable failure processes to resolve a failure with minimal interruption to users.

SUMMARY

Therefore it is an object of this invention to provide a method for detecting a node failure in a distributed database management system.

Another object of this invention is to provide a method for detecting a node failure and for designating a node for failure.

Still another object of this invention is to provide a method for detecting a node failure and for designating a node for failure on a reliable basis.

Yet another object of this invention is to provide a method for detecting a node failure and for designating a node for failure with minimal interruption to users.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
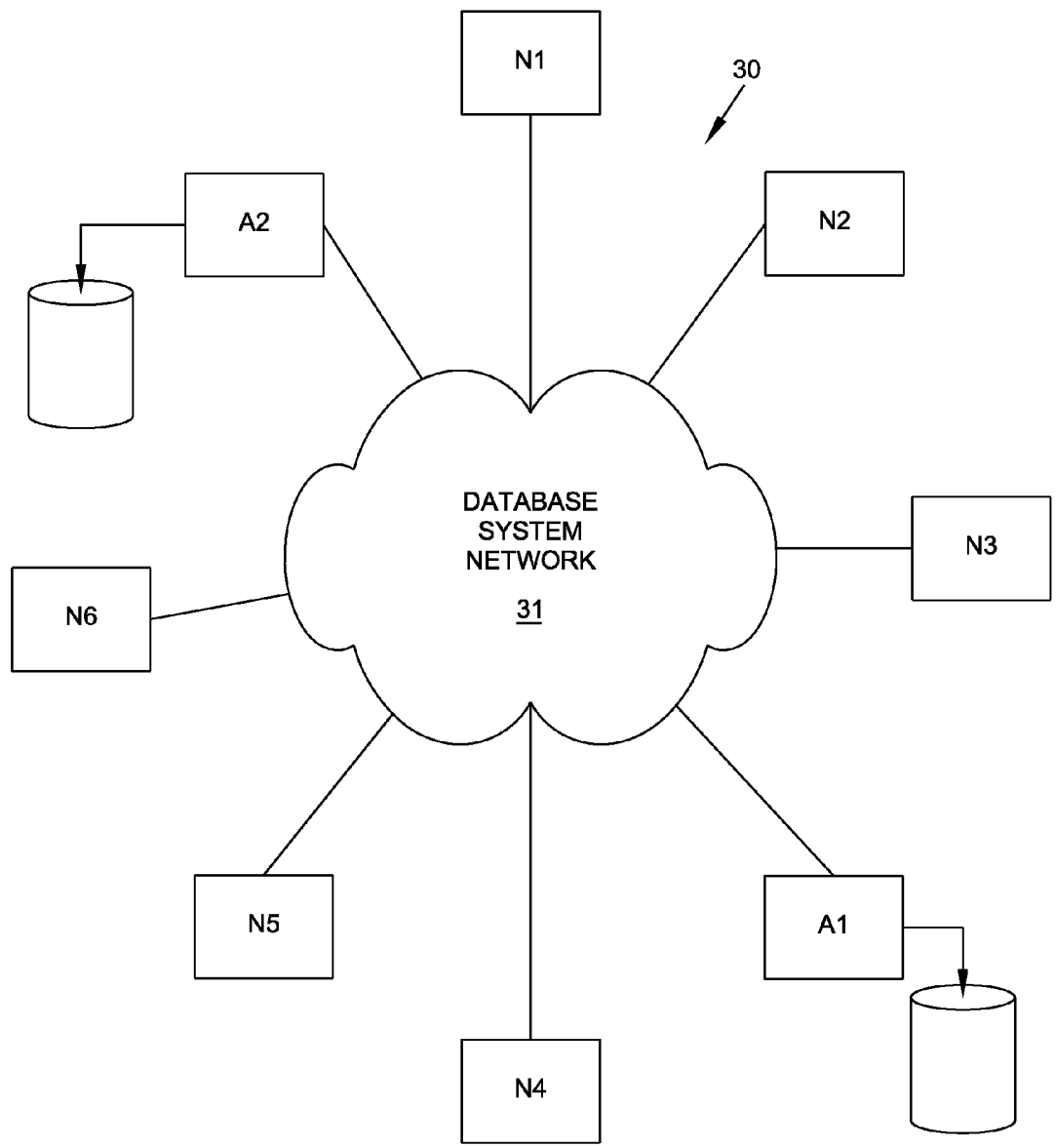
FIG. 1 is a diagram in schematic form of one embodiment of an elastic, scalable, on-demand, distributed database management system that incorporates this invention and that includes interconnected transactional and archival nodes.

FIG. 1 depicts one embodiment of an elastic, scalable, on-demand, distributed database management system 30 with a plurality of data processing nodes that incorporates this invention. Nodes N1 through N6 are "transactional nodes" that provide user applications access to the database; nodes A1 and A2, "archival nodes" that function to maintain a disk archive of the entire database at each archival node. While an archival node normally stores the entire database, a single transactional node contains only that portion of the database it determines to be necessary to support transactions being performed at that node at that time.

Each node in FIG. 1 can communicate directly with every other node in the system 30 through a database system network 31. For example, node N1 can establish a communications path with each of nodes N2 through N6, A1 and A2. Communications between any two nodes is by way of serialized messages. In a preferred embodiment, the messaging is performed in an asynchronous manner to maximize the bandwidth used by the system thereby to perform various operations in a timely and prompt manner. Typically the database system network 31 operates with a combination of high-bandwidth, low-latency paths (e.g., an Ethernet network) and high-bandwidth, high-latency paths (e.g., a WAN network). Each node has the capability to restrict use of a low-latency path to time-critical communications (e.g., fetching an atom). The high-latency path can be used for non-critical communications (e.g. a request to update information for a table). Also and preferably, the data processing network of this invention incorporates a messaging protocol, such as the Transmission Control Protocol (TCP) that assures that each node processes messages in the same sequence in which they were sent to it by other nodes.

Figure 2:
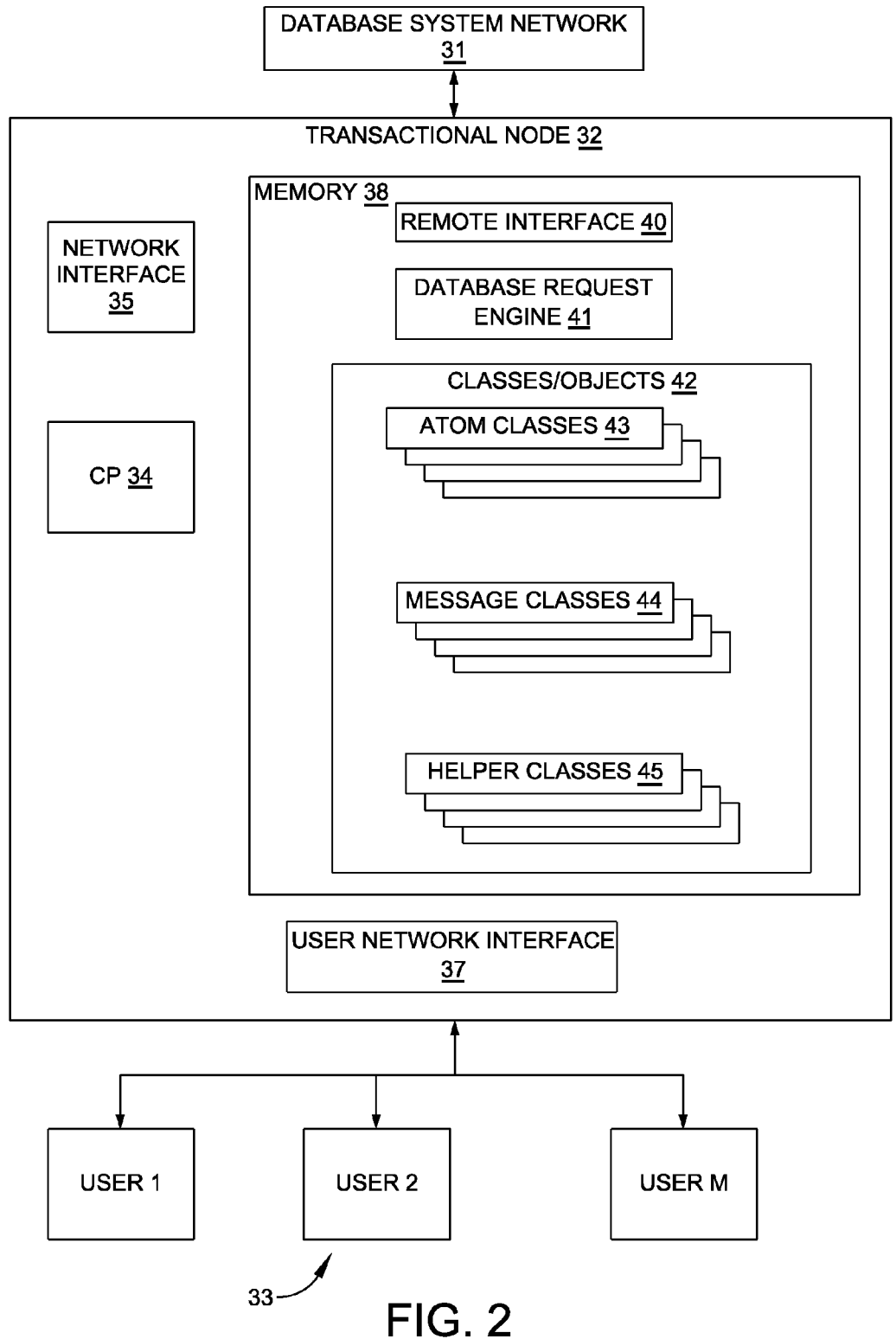
FIG. 2 depicts the organization of a transactional node.

FIG. 2 depicts a representative transactional node 32 that links to the database system network 31 and various end users 33. The transactional node 32 includes a central processing system (CP) 34 that communicates with the database system network 31 through a network interface 35 and with the various users through and user network interface 37. The central processing system 34 also interacts with RAM memory 38 that contains a copy of the database management program that implements a preferred embodiment of this invention. This program functions to provide a remote interface 40, a database request engine 41 and a set 42 of classes or objects.

The database request engine 41 only exists on transactional nodes and is the interface between the high-level input and output commands at the user level and system level input and output commands at the system level. In general terms, its database request engine parses, compiles and optimizes user queries such as SQL queries into commands that are interpreted by the various classes or objects in the set 42. The classes/objects set 42 is divided into a subset 43 of "atom classes," a subset 44 of "message classes" and a subset 45 of "helper classes."

Figure 3:
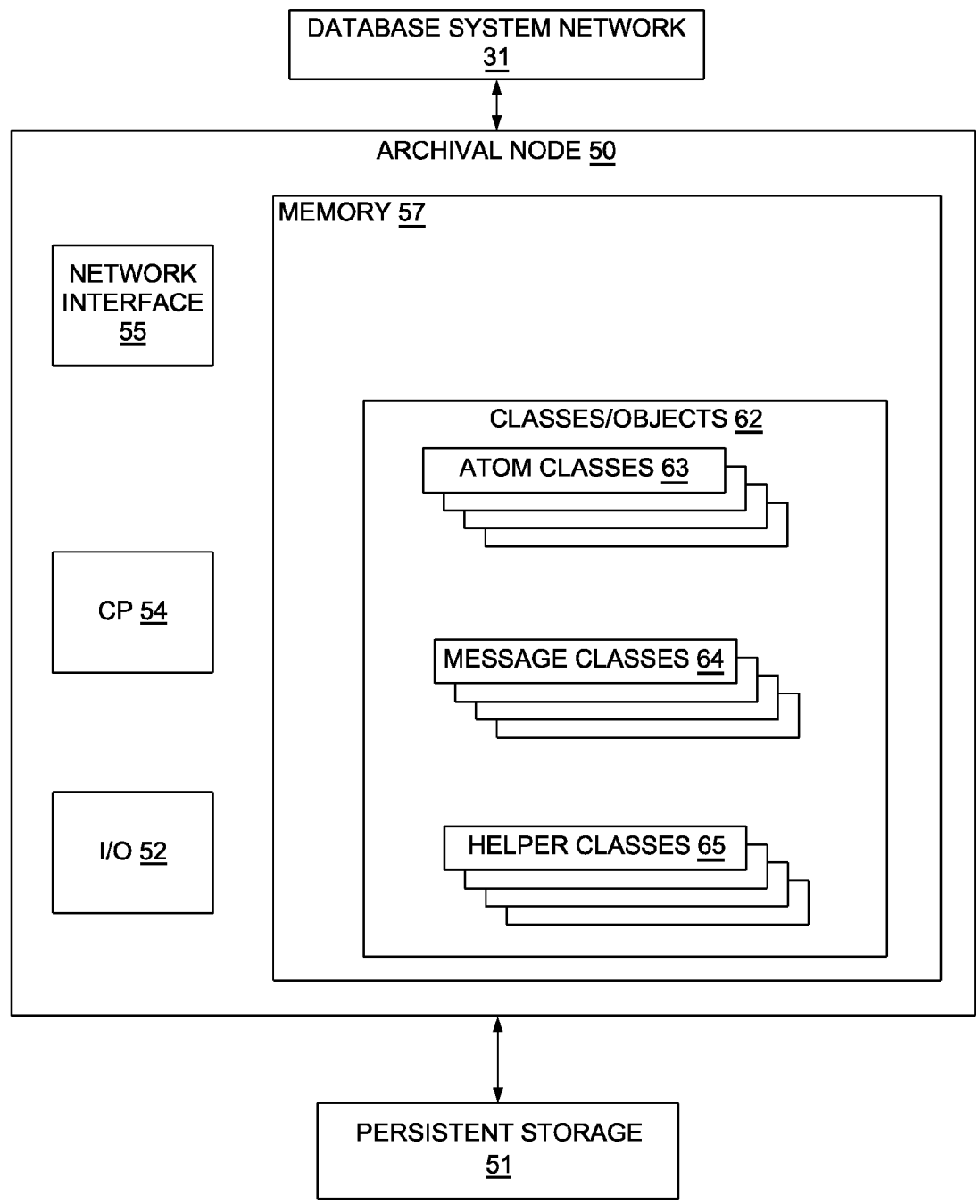
FIG. 3 depicts the organization of an archival node.

Referring to FIG. 3, each archival node 50, such as archival node A1 or A2 in FIG. 1, also connects to the database system network 31. However, in place of end users 33 associated with a transactional node 32 in FIG. 2, an archival node connects only to persistent storage 51, typically a disk-based storage system or a key value store. The archival node 50 includes a central processing system 54 that communicates with the persistent storage 51 through an I/O channel 52 and with the database system network 31 through a network interface 55. The central processing system 54 also interacts with RAM memory 57 that contains a set 62 of classes or objects. Similarly to the transactional node 32 in FIG. 2, the classes/objects set 62 in FIG. 3 includes a set 63 of "atom classes," a set 64 of "message classes" and a set 65 of "helper classes."

The atom classes collectively define atoms that contain fragments of the database including metadata and data. Atoms are replicated from one node to another so that users at different nodes are dealing with consistent and concurrent versions of the database, even during actions taken to modify the information in any atom. At any given time there is no guarantee that all replicated copies of a single atom will be in the same state because there is no guarantee that messages from one node to other nodes will be processed concurrently.

Figures 4, 5:
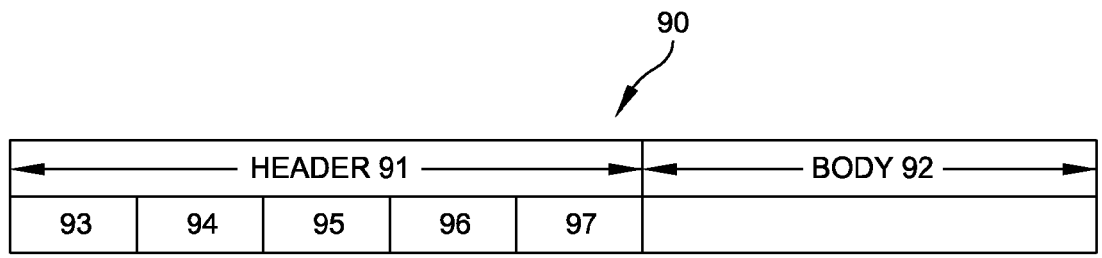
FIG. 4 depicts the syntax of an exemplary asynchronous message that is transferred among the transaction and archival nodes of the system of FIG. 1.
FIG. 5 depicts certain asynchronous messages that are specifically involved with the implementation of this invention.

As previously indicated, communications between any two nodes is by way of serialized messages which are transmitted asynchronously using the TCP or other protocol with controls to maintain message sequences. FIG. 4 depicts the basic syntax of a typical message 90 that includes a variable length header 91 and a variable length body 92. The header 91 includes a message identifier code 93 that specifies the message and its function. The header 91 also includes a software version identification 94, a local identification 95 of the sender and information 96 for the destination of the message as an added identification. From this information the recipient node can de-serialize, decode and process the message.

FIG. 5 depicts a subset of messages having the syntax of FIG. 4 for implementing this invention. As discussed previously, when a message is to be sent, there are different communications paths to different nodes. For example, if one node requests an existing atom, replications of that atom may be obtained from a number of other nodes. In this embodiment, a known "pinging" operation one node sends a "Ping" message to a receiving node. The receiving node returns a "Ping Acknowledge" message to the sending node with time information. In one embodiment each node periodically uses a helper's class to send a Ping message to each of the other nodes to which it connects. Each receiving node uses a helper class to return a Ping Acknowledge message 111 that contains the ping time.

The failure to receive a ping acknowledgement within a predetermined time indicates a break in communications with respect to messages being sent between the requesting or sending node and the recipient or receiving node. In the context of this invention a first node transmits the Ping message 110 to another node and functions as an "informer node" or I-Node if the Ping Acknowledge signal is not received. If there is a failure, the I-Node identifies the receiving node as being suspicious (e.g. an "S-Node") by means of a Suspicious Node message 159. A Leader Acknowledge message 160 triggers a request for each I-Node to respond with information about any suspicious nodes that connect to that specific I-Node.

Figure 6:
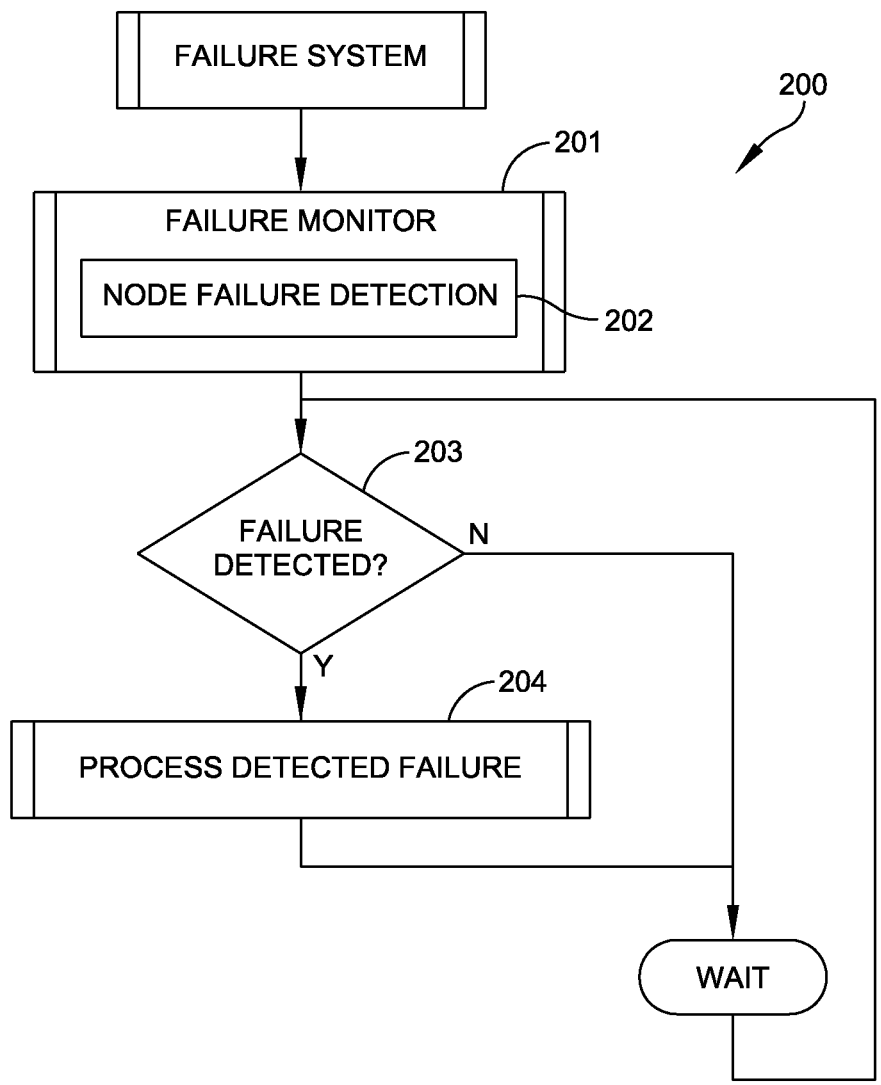
FIG. 6 is a flow diagram of a node failure system that incorporates this invention.

A purpose of this invention is to detect a node failure and enable corrective action. FIG. 6 depicts an overall failure system 200 that includes a failure monitor 201 for detecting various types of failure. A node failure detection process 202 incorporates this invention to provide such an indication. If a failure is detected, step 203 diverts the failure system to a detected failure process 204.

Figure 7:
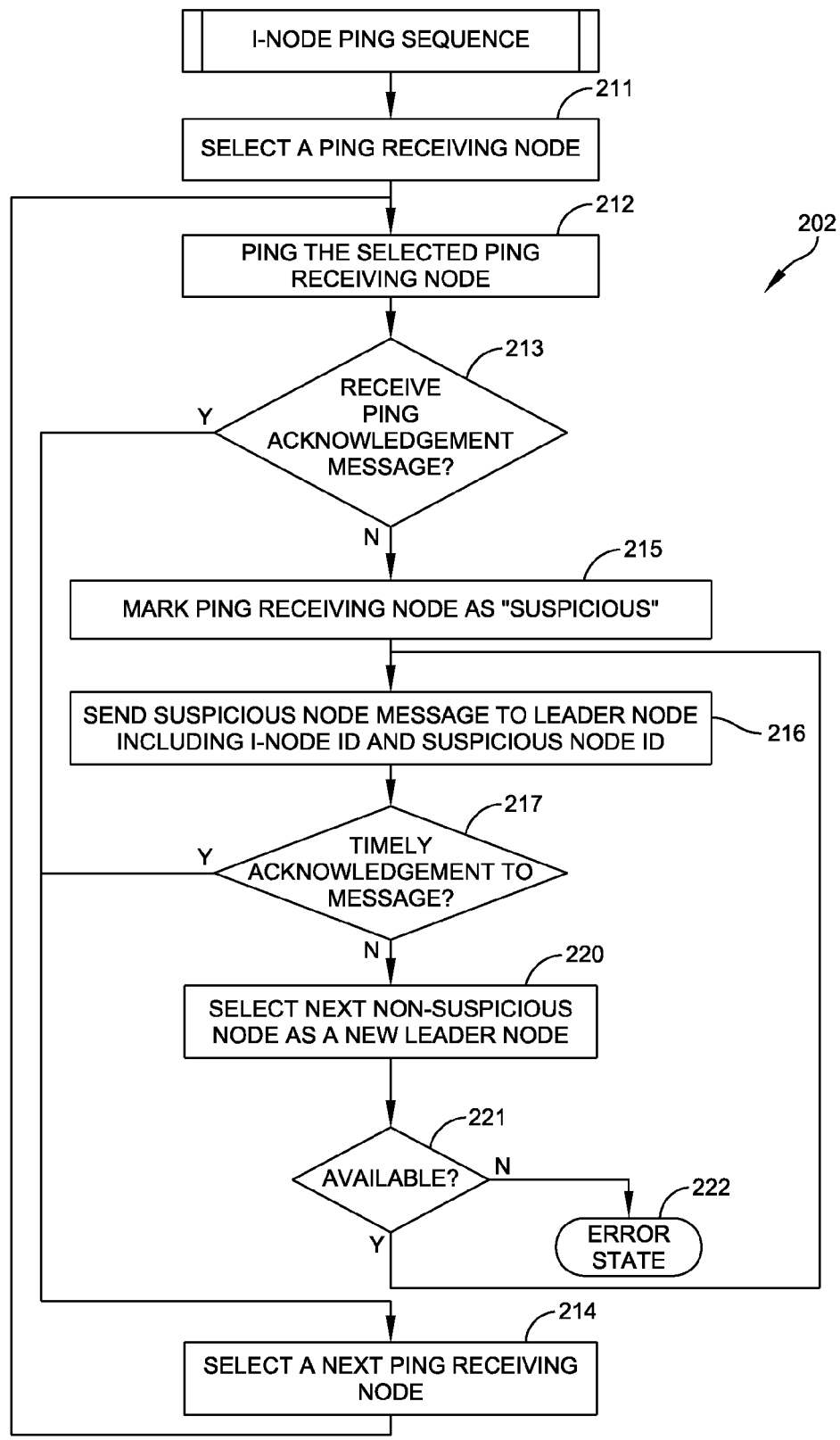
FIG. 7 is a flow diagram of a node failure detection system that identifies possible failures and that is useful in implementing the node failure system of FIG. 6.

Referring to FIG. 7, during an iterative node failure detection process 202, each node, generally in sequence, acts as a sending node of I-node that uses step 211 to select a receiving node and step 212 to ping the selected receiving node. For example, when N1 acts as an I-Node, steps 211 and 212 select an initial receiving node to receive a Ping message at step 212. During successive iterations the I-node will ping nodes N2 through N6, A1 and A2 using step 211 in successive iterations to select each selected receiving node in sequence. If a Ping Acknowledge message is received in a timely fashion at step 213, step 214 selects a next node, such as node N3, for receiving a Ping message.

If no Ping Acknowledge message is received within a defined time interval, it is assumed that a communications break exists. Step 215 marks that receiving node as being "suspicious" with respect to the sending I-Node. Step 216 sends a Suspicious Node message 159 that includes the I-Node identification and Suspicious Node identification in 216 to a Leader Node.

A Leader Node is responsible for analyzing the information received from all the I-Nodes. Only one L-Node can exist at a time and it must be a non-suspicious node. A node can only act as an L-Node if it has received a response for a given set of S-Nodes from a majority of the database as represented by other I-Nodes (i.e., majority of active, non-suspicious nodes). If the active I-Node receives a Leader Acknowledgement message in a timely manner, step 217 uses step 214 to select a next node to be tested by the I-node and control returns to step 212. Otherwise, there is no certainty as to whether the I-node or the node being tested is causing the communications break. Step 220 selects the next non-suspicious node as the new Leader Node. If it is available, step 221 returns control to step 216 and the message is resent to the new L-Node. If no node qualifies as an L-Node, an error state is generated in step 222.

Figure 8:
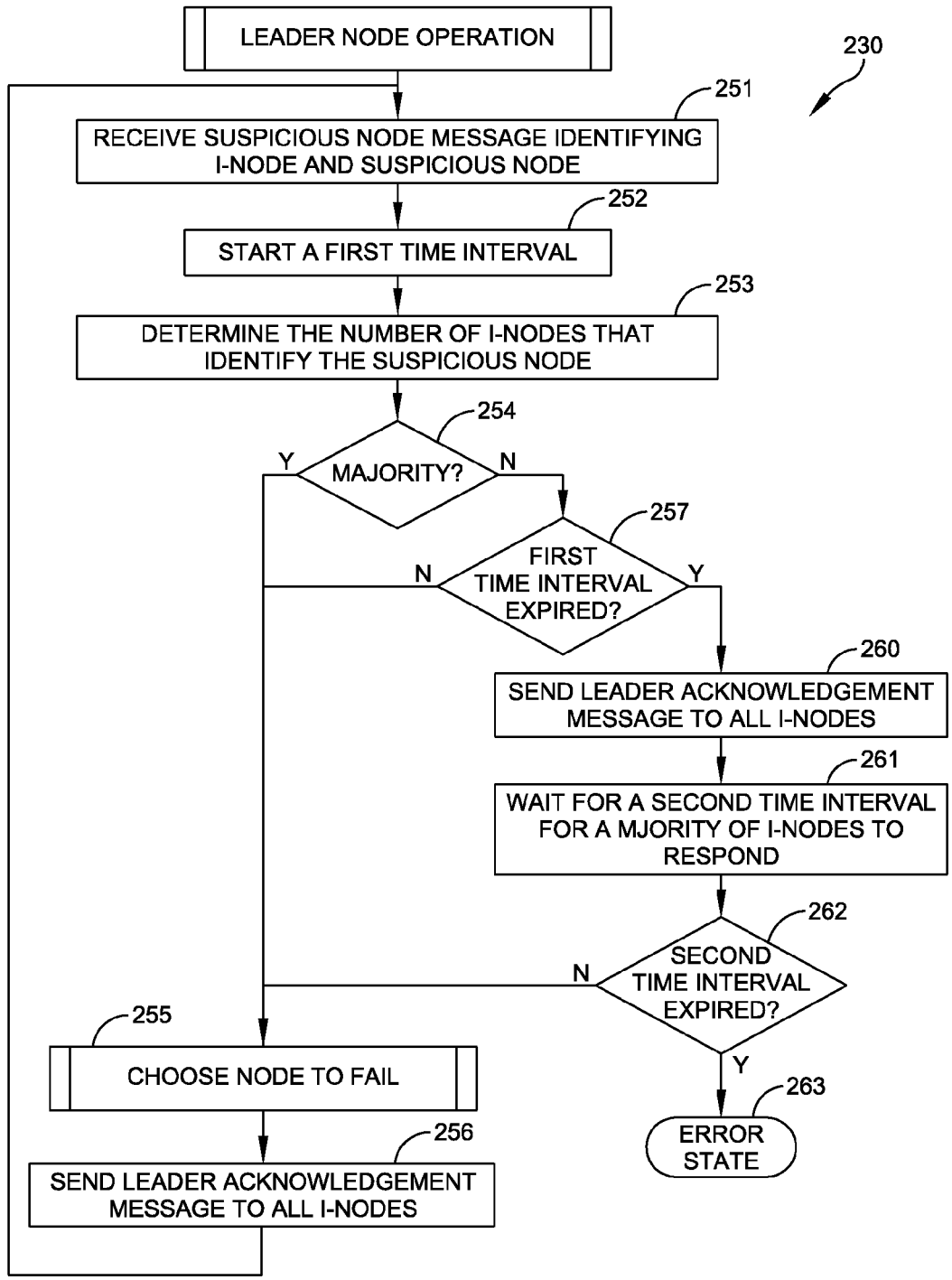
FIG. 8 is a flow diagram of an operation that processes the information obtained in the node failure detection system of FIG. 7.

With respect to the process shown in FIG. 8, whenever a Leader Node receives a suspicious node message that identifies both an I-Node and a suspicious node at step 251, step 252 establishes a first time interval. Step 253 identifies the number of I-Nodes that identify the reported Suspicious Node. If a majority of the active nodes identify the Suspicious Node, step 254 immediately transfers control to a Choose Node to Fail process 255 that chooses the node that is to fail. Step 256 sends a Leader Node Acknowledge message to all I-Nodes. Control then returns to step 251 to await receipt of a the next Suspicious Node message.

If a majority does not exist at the instant of step 253, step 254 transfers control to step 257 that times out the first time interval. If the majority is reached prior to the expiration of that time interval, step 257 diverts control to steps 255 and 256. Otherwise step 257 transfers control to step 260 that sends a Leader Acknowledge message to all I-Nodes and then waits in step 261 for a second time interval to determine whether a majority of I-Nodes respond. At the end of that interval control passes through step 262 to step 255 if a majority of I-Nodes has been identified. If the second time interval expires without obtaining a majority, step 262 diverts to establish an error state at step 263.

Figure 9:
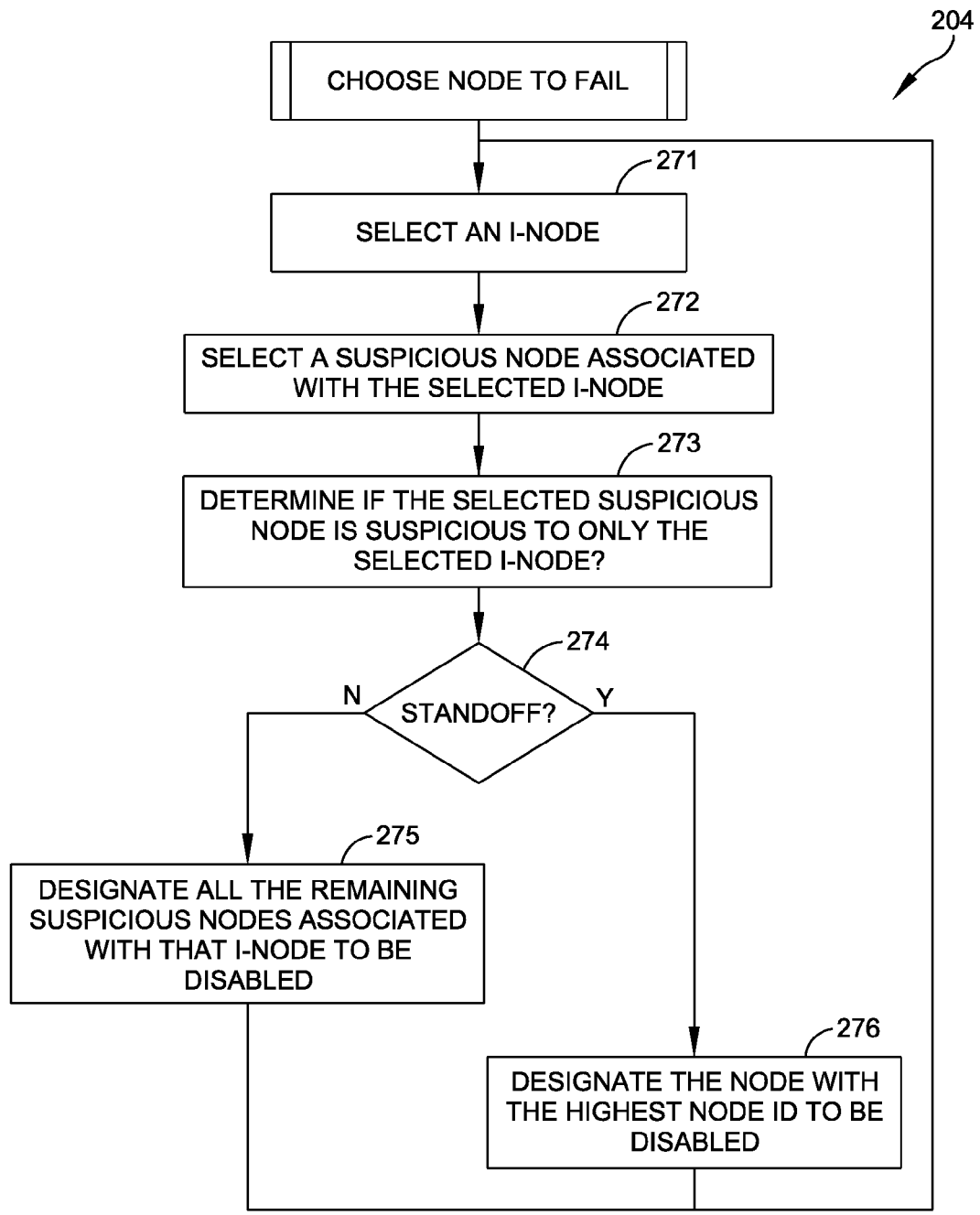
FIG. 9 is a flow diagram of a process for choosing a node to fail based upon information obtained from the operation disclosed in FIG. 8.

FIG. 9 depicts the process 204 in FIG. 6 for designating nodes that should fail. The process selects one I-Node at step 271 that is paired with a Suspicious Node in step 272. Then the system processes step 273 to determine whether the selected Suspicious Node is only suspicious to the selected I-Node. If only the selected I-Node identifies a Suspicious Node, a standoff exists and step 274 diverts control to step 276 that designates the node with the highest node ID as being disabled. If the standoff does not exist, step 274 transfers control to step 275 that designates all the suspicious nodes associated with the selected I-Node to be disabled.

After either step 275, step 276 completes its process and control returns to step 271 to execute the process for another I-Node. When completed all the I-Nodes have been processed the node designations are made available to the failure system 200 in FIG. 6 for being processed in step 204.

Therefore there has been disclosed an embodiment of this invention wherein each node operating with a distributed database monitors communication paths with all other nodes in the network. Any communications break is noted and the network is analyzed to determine nodes that need to be failed. This information is reported for processing whereby failures are handled in orderly fashion with minimal interruption to user activities and in a manner in which data remains consistent and concurrent. More specifically, this invention enhances user access because it detects node failure in an orderly and efficient manner to enable appropriate failure system to maintain the database in a concurrent and consistent manner.

It will be apparent that many modifications can be made to the disclosed apparatus without departing from the invention. For example, this invention has been described with a "majority" defined as a majority of a subset of all the active nodes. In other applications, the "majority" might be defined as a majority of the archival nodes. Still other subsets of nodes could be defined as the basis for determining a majority. Specific messages and processes have been given different titles for purposes of explanation. It will be apparent that equivalent messages and processes could be designed by different names while still performing the same or equivalent functions. Therefore, it is the intent of the appended claims to cover all such variations and modifications as come within the true spirit and scope of this invention.

What is claimed as new and desired to be secured by Letters Patent of the United States is:

1. In a distributed database management processing system including a plurality of nodes and means at each node for establishing a communications path with every other node in the system and each node includes means for transmitting a ping message and for transmitting a ping acknowledgement message in response to a received ping message, a method for detecting failures of individual nodes in the system comprising the steps of:

A) designating one node as a leader node for analyzing information,

B) at each node as an I-node node, transmitting a ping message to each other node as a receiving node, monitoring at the I-node the corresponding communications path for a valid response from each receiving node, and responding to an invalid response by designating the corresponding receiving node as a suspicious node, C) generating a message for transmittal to the leader node with an identification of the I-node and the suspicious node, D) responding to the message in the leader node by identifying other instances for which communications problems have been recorded with the identified suspicious node, determining a number of I-nodes included in the other instances, and where fewer than a majority of the I-nodes are included in other instances, sending an acknowledgement message to all the I-nodes, and E) selectively designating suspicious nodes as failed where the majority of the I-nodes identify the suspicious nodes in a generated message or the majority of the I-nodes identify the suspicious nodes in a response to the acknowledgment message.

2. The method as recited in claim 1 wherein the leader node at the time of designation not be a suspicious node and upon a leader node becoming suspicious, transferring the designation of a leader node to another node.

3. The method as recited in claim 1 wherein upon a transmittal of a message to the leader node by an I-node, the I-node upon a failure to receive an acknowledgment by the existing leader node selects another node that is not suspicious.

4. The method as recited in claim 1 wherein said selective designation of suspicious nodes as failed determines if a selected suspicious node is suspicious to only the selected I-node.

5. The method as recited in claim 4 wherein the node with the highest node identification is designated for being disabled if the selected suspicious node is suspicious to only the selected I-node.

6. The method as recited in claim 4 wherein all remaining suspicious nodes associated with that I-node are designated for being disabled if the selected suspicious node is suspicious to more than the selected I-node.

7. In a distributed database management processing system including a plurality of nodes and means at each node for establishing a communications path with every other node in the system and each node includes means for transmitting a ping message and for transmitting a ping acknowledgement message in response to a received ping message, means for detecting failures of individual nodes in the system comprising:
- A) means for designating one node as a leader node for analyzing information,
- B) at each node as an I-node node, means for transmitting a ping message to each other node as a receiving node, means for monitoring at the I-node the corresponding communications path for a valid response from each receiving node, and means for responding to an invalid response by designating the corresponding receiving node as a suspicious node,
- C) means for generating a message for transmittal to the leader node with an identification of the I-node and the suspicious node,
- D) means for responding to the message in the leader node by identifying other instances for which communications problems have been recorded with the identified suspicious node, means for determining a number of I-nodes included in the other instances, and means for sending an acknowledgement message to all the I-nodes where fewer than a majority of the I-nodes are included in other instances, and
- E) means for selectively designating suspicious nodes as failed where the majority of the I-nodes identify the suspicious nodes in a generated message or the majority of the I-nodes identify the suspicious nodes in a response to the acknowledgment message.

8. The system as recited in claim 7 wherein the leader node at the time of designation is not a suspicious node and means responsive to a leader node becoming suspicious, for transferring the designation of a leader node to another node.

9. The system as recited in claim 7 wherein upon a transmittal of a message to the leader node by an I-node and including means responsive to the failure of an I-node to receive an acknowledgment by the existing leader node for selecting another node that is not suspicious.

10. The system as recited in claim 7 wherein said means for selectively designating suspicious nodes as failed includes means for determining if a selected suspicious node is suspicious to only the selected I-node.

11. The system as recited in claim 10 wherein the node including means responsive to the highest node identification for designating the node for being disabled if the selected suspicious node is suspicious to only the selected I-node.

12. The system as recited in claim 10 additional comprising means for designating all remaining suspicious nodes associated with that I-node for being disabled if the selected suspicious node is suspicious to more than the selected I-node.

13. A distributed database management processing system comprising:
- a plurality of nodes comprising a leader node and one or more I-nodes, each node of the plurality of nodes comprising a network interface coupled to a database system network and a processing system coupled to the network interface, each I-node of the one or more I-nodes being configured to:
  - transmit a ping message to each other node of the plurality of nodes;
  - monitor the database system network for a valid response from each other node of the plurality of nodes;
  - respond to an invalid response from a responding node by designating the responding node as a suspicious node; and
  - generate a message for transmittal to the leader node, the message including an identification of the I-node and the suspicious node;
- the leader node being configured to:
  - respond to the message by identifying other invalid responses from the suspicious node, determining a number of the one or more I-nodes that received invalid responses from the suspicious node, and where fewer than a majority of the one or more I-nodes received invalid responses from the suspicious node, sending an acknowledgement message to all of the one or more I-nodes; and
  - selectively designate suspicious nodes as failed where the majority of the one or more I-nodes identify the suspicious nodes in a generated message or the majority of the one or more I-nodes identify the suspicious nodes in a response to the acknowledgment message.

14. The system as recited in claim 13 wherein the I-node that generated the message is further configured to select another node of the plurality of nodes as a new leader node upon a failure to receive an acknowledgment from the leader node, the new leader node being a node of the plurality of nodes that is not a suspicious node.

15. A distributed database management processing system comprising:
- a plurality of nodes comprising a leader node and one or more I-nodes, each node of the plurality of nodes comprising a network interface coupled to a database system network and a processing system coupled to the network interface, each I-node of the one or more I-nodes being configured to:
  - transmit a ping message to each other node of the plurality of nodes;
  - monitor the database system network for a valid response from each other node of the plurality of nodes;
  - respond to an invalid response from a responding node by designating the responding node as a suspicious node; and
  - generate a message for transmittal to the leader node, the message including an identification of the I-node and the suspicious node;
- the leader node being configured to:
  - respond to the message by identifying that the suspicious node responded with an invalid response to only the I-node that generated the message;
  - selectively designate the suspicious node as failed where the suspicious node has a higher node identification than the I-node that generated the message; and
  - selectively designate the I-node that generated the message as failed where the I-node that generated the message has a higher node identification than the suspicious node.

16. The system as recited in claim 15 wherein the I-node that generated the message is further configured to select another node of the plurality of nodes as a new leader node upon a failure to receive an acknowledgment from the leader node, the new leader node being a node of the plurality of nodes that is not a suspicious node.

* * * * *